US011290802B1

(12) United States Patent
Nandy et al.

(10) Patent No.: US 11,290,802 B1
(45) Date of Patent: Mar. 29, 2022

(54) VOICE DETECTION USING HEARABLE DEVICES

(71) Applicant: Amazon Technologies, Inc., Seattle, WA (US)

(72) Inventors: Dibyendu Nandy, San Ramon, CA (US); Milos Jorgovanovic, Mountain View, CA (US); Carlo Murgia, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/883,888

(22) Filed: Jan. 30, 2018

(51) Int. Cl.
| *H04R 1/10* | (2006.01) |
| *G10L 15/08* | (2006.01) |
| *H04R 1/40* | (2006.01) |
| *H04R 3/00* | (2006.01) |
| *G10L 25/21* | (2013.01) |
| *H04R 3/04* | (2006.01) |
| *G10L 15/22* | (2006.01) |
| *G10L 25/78* | (2013.01) |
| *G10L 15/30* | (2013.01) |

(52) U.S. Cl.
CPC ............ *H04R 1/1041* (2013.01); *G10L 15/08* (2013.01); *G10L 15/22* (2013.01); *G10L 25/21* (2013.01); *G10L 25/78* (2013.01); *H04R 1/1016* (2013.01); *H04R 1/1083* (2013.01); *H04R 1/406* (2013.01); *H04R 3/005* (2013.01); *H04R 3/04* (2013.01); *G10L 15/30* (2013.01); *G10L 2015/088* (2013.01); *G10L 2015/223* (2013.01); *H04R 2420/07* (2013.01)

(58) Field of Classification Search
CPC .. H04R 1/1016; H04R 1/1041; H04R 1/1083; H04R 1/406; H04R 3/005; H04R 3/04; H04R 2420/07; G10L 15/08; G10L 15/22; G10L 15/30; G10L 25/21; G10L 25/78; G10L 2015/088; G10L 2015/223
See application file for complete search history.

(56) References Cited

U.S. PATENT DOCUMENTS

| 4,636,586 A * | 1/1987 | Schiff ...................... H04B 3/23 379/406.08 |
| 2005/0091050 A1* | 4/2005 | Surendran .......... G06K 9/00536 704/226 |

(Continued)

*Primary Examiner* — Mark Fischer
(74) *Attorney, Agent, or Firm* — Lee & Hayes, P.C.

(57) ABSTRACT

Techniques for detecting a voice command from a user of a hearable device. The hearable device may include an in-ear facing microphone to capture sound emitted from an ear of the user, and an exterior facing microphone to capture sound emitted from an exterior environment of the user. The in-ear microphone may generate an in-ear audio signal representing the sound emitted from the ear, and the exterior microphone may generate an exterior audio signal representing sound from the exterior environment. The hearable device may include components to determine correlations or similarities between the in-ear audio signal and exterior audio signal, which indicate that the audio signals represent sound emitted from the user. Further, the components may perform voice activity detection to determine that the sound emitted from the user is a voice command, and proceed to perform further voice-processing techniques.

8 Claims, 7 Drawing Sheets

(56) References Cited

U.S. PATENT DOCUMENTS

| | | | |
|---|---|---|---|
| 2014/0126756 A1* | 5/2014 | Gauger, Jr. | A61F 11/14 |
| | | | 381/309 |
| 2014/0195230 A1* | 7/2014 | Han | G10L 15/22 |
| | | | 704/235 |
| 2017/0154636 A1* | 6/2017 | Geiger | G10L 21/0316 |
| 2017/0178628 A1* | 6/2017 | Macours | G10L 25/78 |
| 2018/0113673 A1* | 4/2018 | Sheynblat | G10L 17/00 |

* cited by examiner

```
┌─────────────────────────────────────────────┐
│ GENERATE, AT LEAST PARTLY USING A FIRST     │
│ MICROPHONE OF AN IN-EAR COMPUTING DEVICE,   │
│ FIRST AUDIO DATA REPRESENTING FIRST SOUND   │
│ EMANATING FROM AN EAR OF A USER OF THE      │
│ IN-EAR COMPUTING DEVICE                     │
│ 602                                         │
└─────────────────────────────────────────────┘
                      │
                      ▼
┌─────────────────────────────────────────────┐
│ GENERATE, AT LEAST PARTLY USING A SECOND    │
│ MICROPHONE OF THE IN-EAR COMPUTING DEVICE,  │
│ SECOND AUDIO DATA REPRESENTING SECOND       │
│ SOUND EMANATING FROM AN ENVIRONMENT OF      │
│ THE USER                                    │
│ 604                                         │
└─────────────────────────────────────────────┘
                      │
                      ▼
┌─────────────────────────────────────────────┐
│ DETERMINE ONE OR MORE CORRELATIONS BETWEEN  │
│ THE FIRST AUDIO DATA AND THE SECOND AUDIO   │
│ DATA                                        │
│ 606                                         │
└─────────────────────────────────────────────┘
                      │
                      ▼
┌─────────────────────────────────────────────┐
│ DETERMINE, BASED AT LEAST IN PART ON THE    │
│ ONE OR MORE CORRELATIONS, THAT THE FIRST    │
│ AUDIO DATA AND THE SECOND AUDIO DATA EACH   │
│ REPRESENT A VOICE OF THE USER OF THE IN-    │
│ EAR COMPUTING DEVICE                        │
│ 608                                         │
└─────────────────────────────────────────────┘
```

FIG. 6

VOICE DETECTION USING HEARABLE DEVICES

BACKGROUND

As the capabilities of computing devices continue to evolve, many different ways have been introduced to allow users to interact with computing devices, such as through mechanical devices (e.g., keyboards, mice, etc.), touch screens, motion, and gesture. Many computing devices are now capable of receiving and responding to voice commands, including tablets, entertainment systems, and portable computing devices. Often, computing devices, such as portable computing devices, are powered by batteries to allow users to move the computing devices freely without requiring constant power from a mains-power source. However, increasing the capabilities of battery-powered devices, such as by voice-enabling the devices, results in larger amounts of power being consumed, which in turn reduces the battery life of battery-powered devices. Accordingly, in order to continue improving the capabilities of battery-powered devices, it is desirable to develop additional power-saving techniques for reducing the amount of power consumed by battery-powered devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 6 illustrates a flow diagram of another example method performed by a hearable device for using an in-ear microphone and an exterior microphone to determine that a user of the hearable device issued a voice command.

DETAILED DESCRIPTION

Figure 1:
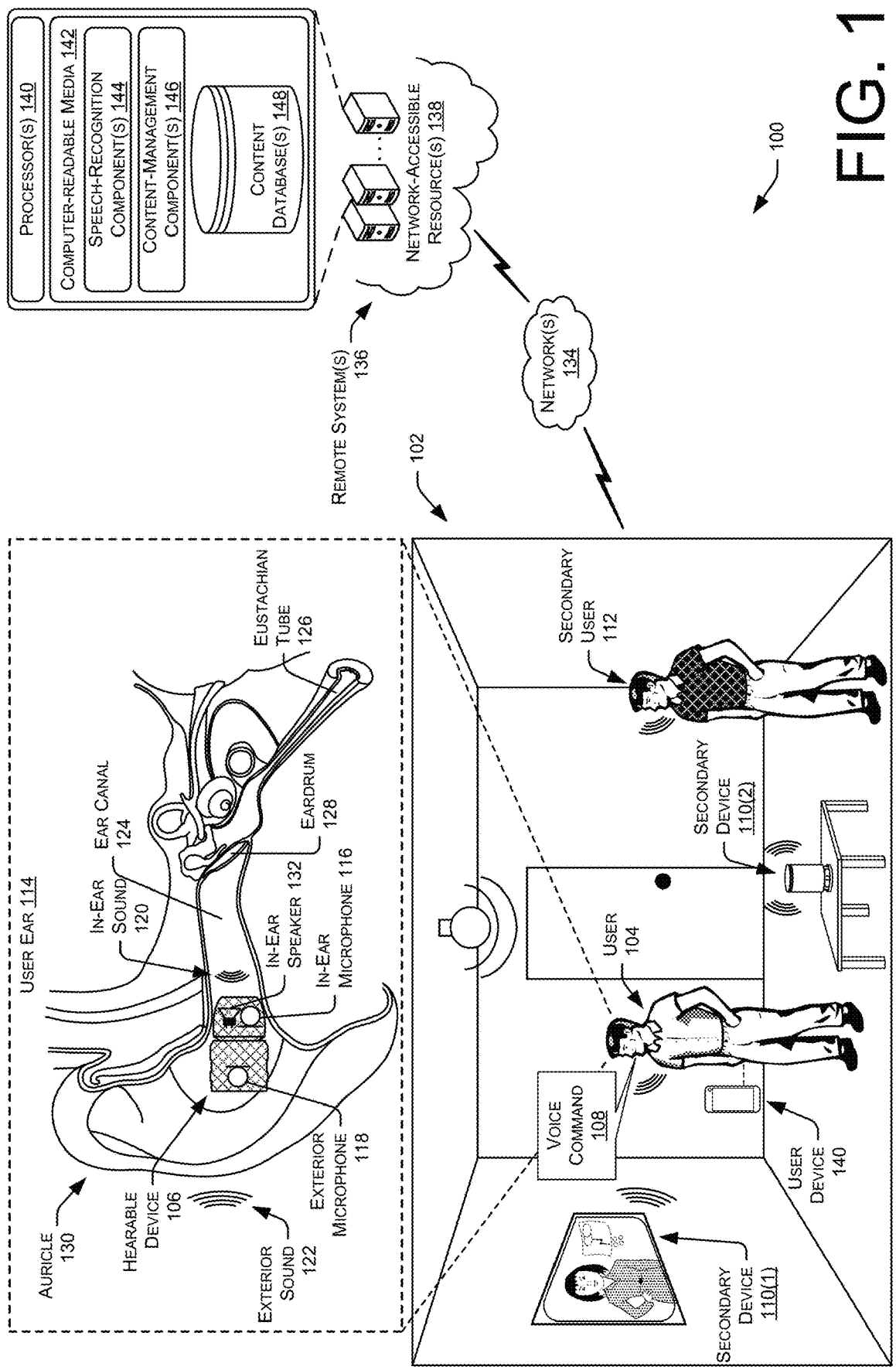
FIG. 1 illustrates a schematic diagram of an illustrative environment in which a user is wearing a voice-controlled, hearable device that detects a voice command from the user. The hearable device may determine that sound captured by microphones of the hearable device was a voice command of the user of the hearable device, as opposed to other sources of sound in the environment.

Due to the usefulness of controlling computing devices using voice commands, the types of computing devices that are becoming controllable using voice commands continues to proliferate. However, controlling devices using voice commands often means that these devices perform voice-processing techniques which consume relatively large amounts of power compared to traditional forms for controlling computing devices. While the amount of power used to perform voice-processing techniques by voice-enabled devices which receive constant power from a mains-power source is generally not problematic, voice-enabled devices that are powered by batteries may experience undesirable reductions in battery life. The reductions in battery life experienced by battery-powered, voice-enabled devices may result in the need for frequent recharging and/or replacement of batteries, which degrades user experience such that voice-enabling certain types of battery-powered devices is infeasible or impracticable.

This disclosure describes, at least in part, techniques for detecting, from sound in an environment, a voice command from a user of an ear-based, wearable computing device, or "hearable device," before performing subsequent various voice-processing techniques used by voice-enabled computing devices. As noted above, the voice-processing techniques used to voice-enable a computing device consume relatively large amounts of power in the realm of certain battery-powered devices. This may be particularly relevant for computing devices with relatively small batteries, such as various types of hearable devices. However, due to the wide-spread use of hearable devices and the usefulness of controlling devices using voice-commands, it is desirable to voice-enable these hearable devices. For example, users of hearable devices find such devices convenient, and potentially necessary, to perform daily actives, such as conducting a phone call while driving (e.g., hands-free driving), listening to music while exercising, and so forth. While battery-powered hearable devices are convenient in that they often do not have a wire running from a user device, such as the user's phone, the user has to their hands to perform functions such as changing the volume for a telephone call, or changing music while exercising. As described herein, the techniques may be performed by any type of ear-based device that is worn on, or near, a user's ear. The hearable device may be a wireless earbud that fits in a user's ear, an ear-muff device that at least partially covers the ear of the user, or any other type of ear-based computing device.

The techniques described herein may reduce the amount of battery power used by voice-enabled hearable devices by determining, prior to performing various voice-processing techniques, that sound captured by microphones of the hearable device corresponds to a voice command of a user of the hearable device, as opposed to background noise or voice commands of other people in an environment of the hearable device. In some examples, the techniques described herein include the use of a voice-enabled hearable device which may include a microphone positioned in the hearable device such that, when worn by a user, faces an ear canal of an ear of the user to capture sound emitted from the ear canal of the user. Further, the voice-enabled hearable device may include another microphone positioned in the hearable device such that, when worn by the user, captures sound from an environment of the user that is exterior the ear of the user. The hearable device may use the in-ear facing microphone to generate an audio signal representing sound emitted largely through the ear canal when the user speaks, and use the exterior facing microphone to generate another audio signal representing sound from the exterior environment of the ear of the user. The hearable device may compare the audio signal representing the in-ear sound, or "in-ear audio signal," with the audio signal representing the exterior environment sound, or "exterior audio signal," and determine whether there are similarities or correlations between the two audio signals. For instance, the hearable device may include one or more components that configure a processor of the hearable device to analyze the audio signals and derive correlations between the signals. In some examples, the components of the hearable device may derive correlations, commonalities, or similarities between the in-ear audio signal and the exterior audio signal, such as correlations between waveforms, correlations between signal amplitude peaks and/or lows, correlations between waveform timing, correlations between energies at specific frequency bands, and so forth. The components may determine, based on the comparison, whether a sufficient correlation (e.g., higher than a threshold confidence value of correlation) exists between the in-ear audio signal and the exterior audio signal such that the sound captured by in-ear microphone and the sound captured by the exterior microphone include the same sound.

In some examples, the hearable device may utilize acoustic isolation between the in-ear microphone and the exterior microphone to prevent the microphones from capturing primarily the same sound waves. For instance, the hearable device may include passive acoustic isolation between the microphones (e.g., acoustic blocking material, such as foam, to fill the user's ear canal, headphones which encapsulate the whole user's ear, etc.), and/or active acoustic isolation (e.g., emitting a noise-canceling waveform from a microphone of the hearable device to cancel out noise) to ensure that the in-ear microphone and exterior microphone do not capture primarily the same sound. In this way, the in-ear microphone generates an in-ear audio signal that represents sound transmitted through the ear canal of the user from other portions of the ear, such as the Eustachian tube, the eardrum, bone, tissue, and so forth. Similarly, the exterior microphone may, using acoustic isolation, generate an exterior audio signal that represents sound from the environment exterior the ear of the user. By acoustically isolating the in-ear microphone from the exterior microphone, the in-ear audio signal may represent sounds that were emitted by the user, such as a voice command, cough, clearing of throat, or other user noises. Similarly, the exterior audio signal will represent sounds from the environment exterior the ear of the user, such as ambient noise, other people speaking, and noises emitted by the user of the hearable device that are loud enough to be detected by the exterior microphone. Thus, when the components of the hearable device determine that correlations exist between the in-ear audio signal and the exterior audio signal, the components may further determine that the correlations represent sounds emitted by the user because the in-ear audio signal may substantially represent sounds emitted by the user.

In some examples, prior to determining whether correlations exist between the in-ear audio signal and the exterior audio signal, the components of the hearable device may process one or both of the audio signals using equalization techniques to, for example, place the two audio signals in a same bandwidth for ease in comparison. Generally, sound emitted by a user that is transmitted through the inner-ear of the user and out the ear canal is affected by bone of the inner-ear, tissue of the inner-ear, etc., though which the sound passes. For instance, sound from the user that emits from the user's ear canal may have a lower resonance based on the length of the user's ear canal, a fall-off at higher frequencies, and/or lack amplitude peaks when compared to sound that comes from the user's mouth. Additionally, sound captured by the exterior microphone may include ambient noise from the environment of the user, a frequency response caused by the auricle of the user's ear (e.g., a head-related transfer function (HRTF) response), and/or high amplitude peaks. Thus, one or both of the in-ear audio signal and exterior audio signal may be processed using equalization techniques, such as using one or more filters (e.g., low-pass filter, high-pass filter, band-pass filter, etc.) to attenuate frequencies or remove frequencies, one or more frequency amplifiers (e.g., operation amplifiers) to boost/amplify frequencies, and/or any other type of equalization processing techniques. In this way, one or both of the in-ear audio signal and exterior audio signal may be equalized such that the two audio signals are in a same, or similar, bandwidth, which may help identify correlations between the two signals.

Irrespective of whether one, or both, of the in-ear audio signal and exterior audio signal are processed using equalization techniques, the components of the hearable device may determine whether correlations exist between the two audio signals. Upon determining that correlations exist between the in-ear audio signal and the exterior audio signal, the components of the hearable device may further perform voice activity detection (VAD) techniques to determine that the audio signals represent a voice command. In some examples, the components may select one of the audio signals, or portions of one, or both, of the audio signals, to use for voice activity detection. For example, the components may identify a portion of the in-ear audio signal, a portion of the exterior audio signal, and/or a combination thereof, that represents at least the correlations between the in-ear audio signal and the exterior audio signal. Using these portion(s), the components may determine, select, or otherwise generate a correlated audio signal which represents at least a portion of the correlations between the in-ear audio signal and the exterior audio signal.

Upon generating the correlated audio signal, the components of the hearable device may determine, using VAD techniques, whether the correlated audio signal represents a voice command of the user. For example, the components may use one or more VAD algorithms based on channel energy with long and short term energies, sub-band long and short term energies with combination logic, Deep Neural Network (DNN) based VADs, or any other type of VAD algorithms, with hangover windows, to determine whether the correlation audio signal represents a voice command. In some examples, the components may determine that the correlation audio signal does not represent a voice command, but instead represents another sound emitted by the user, such as a cough. However, if the components determine that the correlation audio signal represents a voice command from the user, the components of the hearable device may proceed to perform additional voice-processing techniques included in an audio pipeline. For instance, the components may perform various acoustic-processing techniques, such as beamforming, keyword spotting (e.g., wake word detection), and so forth.

In some examples, the techniques described herein may reduce the amount of power consumed by voice-enabled hearable devices. For example, by determining that the in-ear audio signal and exterior audio signal each represent a voice command of a user, as opposed to other noises from the user and/or ambient sounds from the environment of the user, the additional voice-processing techniques in the audio pipeline of the hearable device are only performed when an actual voice command from the user of the hearable device is detected. The additional voice-processing techniques may use additional power to perform, and by detecting a voice command of the user of the hearable device prior to performing these techniques, battery life of the hearable device may be conserved. Further, the techniques described herein may improve the functioning of the hearable devices in other ways. Often, voice-enabled devices are in a lower power mode until a wake word is detected, and subsequent to detecting the wake word, the audio data may begin to be processed and/or transmitted to other devices for processing. With the proliferation of voice-enabled devices, other people in the environment of the user of the hearable device may also attempt to control another voice-enabled device using a voice command that the hearable device detects. Using previous techniques, the hearable device may detect the voice command of the other person and begin processing the voice command if the wake word is detected. This may result in the hearable device performing undesirable actions, such as changing a song based on another person's voice command. However, utilizing the techniques described herein, voice commands from the environment of the user of the hearable device will be determined as not being issued by the actual user of the hearable device, and will not be processed further by the hearable device.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a schematic diagram 100 of an illustrative environment 102 in which a user 104 is wearing a voice-controlled, hearable device 106 that detects a voice command 108 from the user 104. The hearable device 106 may determine that sound captured by microphones of the hearable device 106 was the voice command 108 of the user 104 of the hearable device 106, as opposed to other sources of sound in the environment 102.

As illustrated, the environment 102 may not only include the user 104, but may further include other potential sources of sound. For example, multiple secondary devices 110 may be outputting sound, such as a secondary device 110(1) of a television may be outputting sound for a television show, a secondary device 110(2) of a portable audio input/output device may be outputting music, a secondary user 112 may be issuing an additional voice command to control operations of the secondary device 110(2), and so forth. In such examples, the hearable device 106 may be a voice-enabled device to determine what sound in the environment 102 is a voice command 108 to be processed to determine a command issued by the user 104 of the hearable device 106. Traditionally, multiple sources of sound may result in a voice-controlled device to continuously attempt to process the different sound emitted by the different sources in order to identify a voice command of the user 108. As described above, processing audio signals using voice-processing techniques may be a power-intensive process. While additional processing of audio signals may not be burdensome for user devices that are powered by a mains-power source, battery-powered devices may experience undesirable reductions in battery life. In some examples, the voice-enabled, hearable device 106 may include audio-signal-processing techniques that occur upon detection of a wake word in the voice command 108 of the user 104. However, the pre-processing techniques used on audio signals representing the voice command 108 to detect the wake word may use relatively large amounts of power, and may cause undesirable reduction in battery life of the hearable device 108 if continuously being performed upon detecting sound.

As illustrated in FIG. 1, the hearable device 106 may be positioned in an ear 114 of the user 104. The hearable device 106 may include an in-ear microphone 116 and an exterior microphone 118, wherein the in-ear microphone 116 captures in-ear sound 120, and the exterior microphone 118 captures exterior sound 122. The in-ear microphone 116 may be positioned in the hearable device 106 such that, when the hearable device 106 is worn in the user's ear 114, the in-ear microphone captures the in-ear sound 120 emitted from an ear canal 124 of the user ear 114. The in-ear sound 120 may be sound that was emitted by the user 104, and has traveled through the inner portions of the ear 114, such as through the eustachian tube 126, an eardrum 128, the ear canal 124, and/or other bone and tissue of the ear 114. The exterior microphone 118 may be positioned in the hearable device 106 such that, when the hearable device 106 is worn in the user's ear 114, the exterior microphone 118 captures the exterior sound 122 and generates an exterior audio signal. In some examples, the exterior sound 122 may be captured by the exterior microphone 118 and have a frequency response caused by the auricle 130 of the user's ear 114 (e.g., a head-related transfer function (HRTF) response). The hearable device may have passive and/or active acoustic isolation such that the in-ear microphone 116 captures little, or no, exterior sound 122, and the exterior microphone 118 may detect little, or no, in-ear sound 120. In various examples, the hearable device 106 may further include an in-ear speaker 130 that outputs audio data, such as streaming music audio data or telephone call audio data, into the ear canal 124 towards the eardrum 128 of the user 104.

Thus, the hearable device 106 may include the in-ear microphone 116 to generate in-ear audio signals representing the in-ear sound 120, and may further include the exterior microphone 118 to generate exterior audio signals representing the exterior sound 122. After generating an in-ear audio signal and an exterior audio signal, components of the hearable device may determine whether the audio signals have correlations or similarities. For example, the components of the hearable device 106 may derive correlations, commonalities, or similarities between the in-ear audio signal and the exterior audio signal, such as correlations between waveforms, correlations between signal amplitude peaks and/or lows, correlations between waveform timing, correlations between energies at specific frequency bands, and so forth. The components may determine, based on the comparison, whether a sufficient correlation (e.g., higher than a threshold confidence value of correlation) exists between the in-ear audio signal and the exterior audio signal such that the in-ear sound 120 captured by in-ear microphone 116 and the exterior sound 122 captured by the exterior microphone 118 include the same sound. As described in more detail with respect to FIG. 2, the components of the hearable device 106 may perform various equalization processing techniques on one, or both, of the in-ear audio signal and the exterior audio signal prior to determining or identifying the correlations or similarities. In examples where the audio signals do not have correlations, or more than the threshold amount of correlation, the hearable device 106 may determine that the in-ear audio signal and the exterior audio signal do not represent a voice command 108 of the user 104. However, if the components identify correlations or similarities, the components may determine that the in-ear audio signal and exterior audio signal represent a sound issued by the user 104, and proceed to perform VAD.

As described in more detail below with respect to FIG. 2, the components may perform the VAD techniques on the in-ear audio signal, the exterior audio signal, or portions of one or both of the signals (e.g., a correlation audio signal). In examples where the components detect the voice command 108 in the correlation audio signal, the components may proceed to perform further acoustic-processing techniques for voice-processing (e.g., beamforming, keyword spotting, etc.). However, if the components determine using the VAD techniques that the correlation audio signal represents sound other than speech (e.g., a cough, clearing throat, etc.), the components of the hearable device 106 may refrain from performing further voice-processing techniques.

The hearable device 106 may include components that enable the device 106 to perform various operations based on the voice commands 108, such as streaming audio data (e.g., music) and outputting the audio data using the in-ear speaker 132, performing a telephone call, and so forth. In some examples, the hearable device 106 may be a sophisticated voice-enabled device 106 and include components for processing the voice command 108 to determine an intent of the voice command 108 of the user 104, and further determining an operation that the hearable device 106 is to perform based on the intent of the voice command of the user 106. However, the hearable device 106 may, in some examples, have less functionality and may simply perform some types of pre-processing on audio data representing the voice commands 108 of the user 104. For instance, the hearable device 106 may merely serve as an interface or "middle man" between a remote system, or server, and the user 104. In this way, the more intensive processing used for speech processing may be performed using large amounts of resources of remote services.

Accordingly, the hearable device 106 may include network interfaces which configure the hearable device 106 to communicate over one or more networks 134 to send and receive data with various computing devices, such as one or more remote systems 136 which may include various network-accessible resources 138. In some examples, the remote system(s) 136 may be a speech processing system (e.g., "cloud-based system," "software as a service (SaaS)," "network-accessible system," etc.) which receives audio data from the hearable device 106 representing a voice command 108 of the user 104. For instance, the hearable device 106 may receive a "wake" trigger (e.g., wake word) which indicates to the hearable device 106 that the user 104 is speaking a voice command 108, and the hearable device 106 may begin streaming, via a network interface and over the network(s) 134, audio data representing the voice command 108 as captured by the microphones of the hearable device 106 to the remote system(s) 136. However, in some examples, the hearable device 106 may be unable to, or refrain from doing so to conserve power, communicate over certain network(s) 134 (e.g., wide-area networks). In such examples, the hearable device 106 may be communicatively coupled to a user device 140 in the environment 102 of the user 104. The hearable device 106 may communicate audio data representing the voice command 108 to the user device 140 using the network interfaces and over another network (e.g., Bluetooth, WiFi, etc.). The user device 140 may be configured to, in turn, transmit the audio data representing the voice command 108 to the remote system(s) 136 over the network(s) 134.

The network(s) 134 which connect the hearable device 106 to the remote system(s) 136 may represent an array or wired networks, wireless networks (e.g., WiFi), or combinations thereof. The remote system(s) 136 may generally refer to a network-accessible system—or "cloud-based system"—implemented as a computing infrastructure of processors, storage, software, data access, and so forth that is maintained and accessible via the network(s) 134, such as the Internet. Cloud-based systems may not require end-user knowledge of the physical location and configuration of the system that delivers the services. As illustrated, the remote system(s) 136 may comprise the network-accessible resource(s) 138, such as servers. Multiple of such resources 138 may be included in the system(s) 136. For instance, the network-accessible resource(s) 138 may include one or more processors 140, which may include a central processing unit (CPU) for processing data and computer-readable instructions, and computer-readable storage media 142 storing the computer-readable instructions that are executable on the processor(s) 140. The computer-readable media 142 may individually include volatile random access memory (RAM), non-volatile read only memory (ROM), non-volatile magnetoresistive (MRAM) and/or other types of memory, and may store one or more speech-recognition component(s) 144, such as an automatic speech-recognition (ASR) component or system and a natural-language-understanding (NLU) component or system.

In some examples, the ASR component or system of the speech-recognition component(s) 144 may receive audio data from the user device 140 that represents a voice command 108 and begin performing ASR on the audio data to generate text data that represents words of the voice command 108. Further, the NLU component or system of the speech-recognition component(s) 144 may then use NLU to identify one or more user voice commands 108, and intents of those voice commands 108, from the generated text data. Finally, the speech-recognition component(s) 144 may determine an instruction or command to perform, or for the hearable device 106 to perform, based on the intent of the voice commands 106. For instance, the speech-recognition component(s) 144 may determine that the user 104 is requesting that the hearable device 106 stream music, control a secondary device (e.g., turn on a TV, conduct a phone call using a cell phone, etc.), perform a phone call using the user device 140, and so forth. The speech-recognition component(s) 144 may then cause the remote system(s) 136 to relay the command or instruction to the hearable device 106 and/or the user device 140.

In some examples, the computer-readable media 142 may further store one or more content-management components 146 that are configured to manage content stored in one or more content databases 148. The content-management component(s) 146 and the content database(s) 148 may be stored at a single location, or across different locations and in different arrangements of computing devices of the network-accessible resource(s) 138. In some examples, the content-management component(s) 146 may be associated with a same operator of the speech-recognition component(s) 144 and manage or obtain content from the content database(s) 148 based on commands determined by the speech-recognition component(s) 132. For instance, the speech-recognition component(s) 144 may determine that a voice command 108 of the user 104 detected by the hearable device 106 is a request to stream music that is stored in the content database(s) 148. The content-management component(s) 146 may receive an indication of that request, and an indication of the music, and cause the hearable device 106 to stream music from the content database(s) 148. For instance, the content-management component(s) 146 may be executable by the processor(s) 140 to identify a storage location in the content databases(s) 148 where the desired music is stored. In some examples, this may comprise the content-management component(s) 146 requesting a third-party device or system of devices (e.g., Pandora, Spotify, etc.) for a universal resource location (URL) which indicates the location at which the music is stored that the hearable device 106 is to stream. The content-management component(s) 146 then sends an indication of the URL to the hearable device 106, which in turn accesses and begins streaming the audio data from the content database(s) 148 and outputs the audio data using the in-ear speaker 132 of the hearable device 106. However, the content database(s) 148 may store any types of data and stream or otherwise send the data to the hearable device 106.

Figure 2:
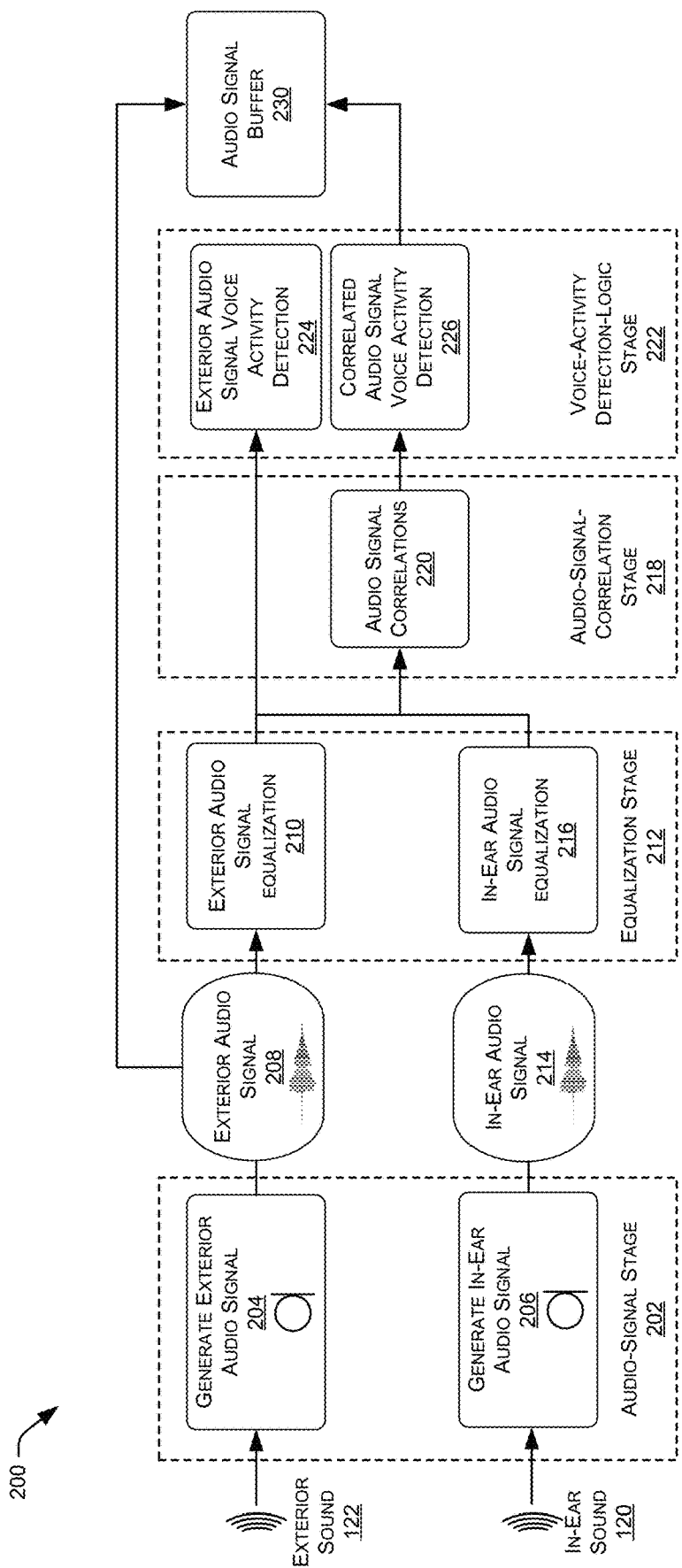
FIG. 2 illustrates a flow diagram of an example method performed by a hearable device for using an in-ear microphone and an exterior microphone to detect speech of a user of the hearable device.

FIG. 2 illustrates a flow diagram of an example method 200 performed by a hearable device 106 for using an in-ear microphone 116 and an exterior microphone 118 to determine that a user 104 of the hearable device 106 issued a voice command 108.

The method 200 may include an audio-signal stage 202 where the exterior microphone 118 captures the exterior sound 122 from the environment 102 of the user 104, and generates, at 204, an exterior audio signal that represents the exterior sound 122. Further, in the audio-signal stage 202, the in-ear microphone 116 captures the in-ear sound 120 and generates, at 206, an in-ear audio signal that represents the in-ear sound 120.

The method 200 may further include an equalization stage 212 where the components of the hearable device 106 may process one or both of the audio signals using equalization techniques to, for example, place the two audio signals in a same bandwidth for ease in comparison. In such examples, the exterior audio signal 208 may be processed using an exterior audio signal-equalization process 210. Generally, the exterior sound 122 represented in the exterior audio signal 208 may include ambient noise from the environment 102 of the user 104, a frequency response caused by the auricle 130 of the user's ear 114 (e.g., a head-related transfer function (HRTF) response), and/or high amplitude peaks. The exterior audio signal 208 may be processed using an exterior audio signal-equalization process 210, which may include the user of one or more filters (e.g., low-pass filter, high-pass filter, band-pass filter, etc.) to attenuate frequencies, one or more frequency amplifiers (e.g., operation amplifiers) to boost/amplify frequencies, and/or any other type of equalization processing techniques.

Similarly, the equalization stage 212 may include an in-ear audio signal-equalization process 216 where the in-ear audio signal 214 may be processed using equalization techniques. In some examples, the in-ear sound 120 represented by the in-ear audio signal 214 may be affected by bone of the inner-ear 114, tissue of the inner-ear 114, etc., though which the in-ear sound 120 passes. For instance, sound 120 from the user 104 that emits from the user's ear canal 124 may have a lower resonance based on the length of the user's ear canal 124, a fall-off at higher frequencies, and/or lack amplitude peaks when compared to sound that comes from the user's 104 mouth. Thus, the in-ear audio signal 214 may be processed at the in-ear audio signal-equalization process 216 using equalization techniques, such as using one or more filters (e.g., low-pass filter, high-pass filter, band-pass filter, etc.) to attenuate frequencies, one or more frequency amplifiers (e.g., operation amplifiers) to boost frequencies, and/or any other type of equalization processing techniques. Accordingly, one or both of the in-ear audio signal 214 and/or the exterior audio signal 208 may be equalized such that the two audio signals are in a same, or similar, bandwidth, which may help identify correlations between the two signals.

In some examples, the in-ear audio signal 214 may represent speech and other internal sounds from a vocal tract of the user 104. The speech and other internal sounds represented in the in-ear audio signal 214 may have been attenuated in the higher frequencies, such as frequencies including fricatives and pseudo-fricatives (e.g., sounds such as "f," "s," "h," etc.). For instance, the high frequencies that are attenuated may be caused by turbulent air flows at the front of the user's mouth, and thus are not included in the sound that passes from the vocal tract of the user 104 and through the ear canal without passing through the mouth of the user. In general, the frequency response of the speech detected by the in-ear microphone 116 may be low-pass in character and may extend from roughly 50-100 kHz to 3 Hz. Due to the seal between the ear 114 and the hearable device 106, the upper frequency bound may be lower for some individuals and, due to the occlusion of the seal, the low frequencies of the resonance within the ear canal 124 may be boosted, in some examples, by up to 20 dB at a frequency band (e.g., roughly 200-500 Hz). Accordingly, this "occlusion effect" of the user emitted sounds captured by the inner ear mic may be equalized by attenuating the boosted resonance frequencies (e.g. in the 200-500 Hz range), for utterances by the user. However, if the seal between the ear 114 and the hearable device 106 is not completely sealed or changes (e.g., as the jaw moves), then the resonance peak may drop and the higher frequencies may extend due to leakage to/from the exterior, acoustic environment 102. Also, the exterior audio signal equalization stage 210 (and in some examples, also the in-ear audio signal equalization stage 216) may include a filter, such as a low-pass filter, to limit the high frequency to less than a threshold value (e.g., 3 kHz) and to equalize for the drop-off in high frequencies (e.g. above 3 kHz) in the in-ear audio signal 214.

Thus, the exterior audio signal equalization stage 210 (and potentially the in-ear audio signal equalization stage 216) may include a low-pass filter, and/or band-pass filter, configured to attenuate high frequency components of the exterior audio signal 208 to lower than a threshold frequency (e.g., 3 kHz). The exterior audio equalization may also include equalization to remove the gross effect of the head related transfer function (HRTF) of the head and our ear (pinna) of the user. Further, the in-ear audio signal equalization stage 216 may include one or more components, such as a parametric equalizer, configured to modify amplitudes certain frequency components (e.g., lower frequency components) included in the in-ear audio signal 214 (e.g., attenuate a low frequency range of approximately 200-500 Hz by various up to 20 dB). In this way, the exterior audio signal 208, and the in-ear audio signal 214, may be equalized at the equalization stage 212 into a common frequency range for comparison between the two equalized signals at the audio-signal correlation stage 218. Stated otherwise, the exterior audio signal 208 and the in-ear audio signal 214 may be equalized to match their respective signal energies (e.g., energy spectral density measurements, squared energy measurements, absolute energy-based measurements, etc.) into a common frequency range, or similar frequency ranges for utterances by the user.

In various examples, some of the techniques described herein may employ of the use of various types of algorithms, or transforms, to analyze the audio signals and audio data. For instance, analog to digital converters may be employed to generate or convert the audio signals and audio data from analog to digital. Further, various types of transforms may be employed. For instance, some of the techniques described herein may be used on the audio data while represented in the time domain, while some of the techniques may be used on the audio data represented in the frequency domain. As an example, to identify frequency components, audio data may be represented in the frequency domain using a transform, such as a Fourier Transform (e.g., Fast Fourier Transform, discrete Fourier Transforms, etc.), Hartley Transform, Fourier Series, Laplace transforms, Z transforms, etc. The audio signals may be split into frequency ranges, frequency bands, or frequency components, for various purposes. For instance, the frequency components/ranges may be used to identify the energy measurements for various frequency components or ranges, which may be used for comparison to determine whether there are correlations between the frequency bands or ranges.

In some examples, the method 200 may further include an audio-signal-correlation stage 218. At the audio-signal-correlation stage 218, the equalized exterior audio signal 208 and the equalized in-ear audio signal 214 may be analyzed by components of the hearable device 106 to identify one or more audio signal correlations 220. As noted above, the equalized exterior audio signal 208 and the equalized in-ear audio signal 214 may be equalized to be in a same bandwidth for ease in comparison. However, in some examples, the audio signals need not move through the equalization stage 212, and may simply proceed as generated by the microphones to the audio-signal-correlation stage 218. Irrespective of whether the signals were equalized or not, during the audio-signal-correlation stage 218, the components of the hearable device 106 may derive correlations, commonalities, or similarities between the equalized in-ear audio signal 214 and the equalized exterior audio signal 208, such as correlations between waveforms, correlations between signal amplitude peaks and/or lows, correlations between waveform timing, and so forth. The components may determine, based on the comparison, whether a sufficient correlation (e.g., higher than a threshold confidence value of correlation) exists between the equalized in-ear audio signal 214 and the equalized exterior audio signal 208 such that the in-ear sound 120 captured by in-ear microphone 116 and the exterior sound 122 captured by the exterior microphone 118 include at least the same sound.

In some examples, at the audio-signal-correlation stage 218, the components of the hearable device 106 may derive or identify the audio signal correlations 220. For instance, the components may identify, by analyzing or comparing the exterior audio signal 208 and the in-ear audio signal 214, similarities or correlations between the two signals. In some examples, the components may identify a common waveform represented in the two signals based on each of the signals including a waveform with more than a threshold amount of similarity. Further, the components may identify portions of the two signals that overlap in time when compared, or identify signal peaks and/or signal lows that match when compared to each other in time. For instance, a signal peak represented in the exterior audio signal 208 may correspond in time to a signal peak represented in the in-ear audio signal. Further, the components may identify portions of the audio signals which do not correspond, and determine that those portions of the signals do not represent sound from the user.

In some examples, during the audio-signal-correlation stage 218, the components of the hearable device 106 may receive the equalized exterior audio signal 208, and the equalized in-ear audio signal 214. The components may then separate the frequency ranges of the two equalized audio signals into a set of frequency bands and evaluate the energy within each band for each of the equalized exterior audio signal 208, and the equalized in-ear audio signal 214. The sets of energies for each of the equalized signals may be compared. Generally, the formant energies of voiced components (up $2^{nd}$ and even $3^{rd}$ formants) may be within 3 kHz. Thus, tracking these energies over time may yield a common energy signature when the user 104 issues a voice command. The comparison between these sets of energies may be performed using various methods, such as normalized correlation in time, Euclidean distance, and/or other linear and non-linear statistical matching models. If a mismatch exists between the energies, such that some frequency bands in the equalized inner ear mic audio signal are attenuated while the same frequency bands in the equalized outside mic audio signal have higher energy, then the mismatch may be indicated as an external sound, such as by associating a "0" with the portion of the equalized exterior audio signal 208 where the energies are not matched with the equalized in-ear audio signal 214. Alternatively, if an energy level of the equalized in-ear audio signal 214 for a set of frequency bands are significantly higher than the corresponding energy level of the equalized exterior audio signal 208, for the same set of frequency bands, the energy levels may be classified as an internal sound, such as a swallow of the user 104. However, if the energies match within a certain range of variation between the equalized exterior audio signal 208 and the in-ear audio signal 214, then it may be determined that the signals each represent speech of the user 104, and the portions of the exterior audio signal 208 (and/or in-ear audio signal 214) that match may be associated with data indicating the match (e.g., associating a "1" with the matching portions). In this way, the audio-signal correlation stage 218 may utilize squared energy, or an absolute energy-based, measure to match signal energies in a common frequency range of the two equalized signals to identify which portions of the two equalized signals match.

Upon detecting correlations between the equalized in-ear audio signal 214 and the equalized exterior audio signal 208, the components of the hearable device 106 may, at the audio-signal-correlation stage 218, further generate, select, or otherwise determine a correlated audio signal which represents at least a portion of the correlations between the equalized in-ear audio signal 214 and the equalized exterior audio signal 208. For example, the components may select one of the equalized audio signals, or portions of one, or both, of the equalized audio signals, to use for voice activity detection. The components may identify a portion of the equalized in-ear audio signal 214, a portion of the equalized exterior audio signal 208, and/or a combination thereof, that represents at least the correlations between the equalized in-ear audio signal 214 and the equalized exterior audio signal 208. In this way, the components of the hearable device 106 may generate a correlated audio signal for further processing.

In some examples, the components of the hearable device 106 may generate audio data which represents the similarities or correlations between the two signals. For example, the components may generate data, such as a "1s," that indicate which parts of the exterior audio signal 208 are correlated to the in-ear audio signal 214. Further, the components of the hearable device 106 may generate data, such as "0s," which indicate which parts of the exterior audio signal 208 are not correlated to the in-ear audio signal 214. The audio data that represents the similarities, or correlations, between the two audio signals (e.g., 1s and 0s) may then be sent to the voice-activity-detection (VAD) logic stage 222.

The method 200 may include a voice-activity-detection (VAD) logic stage 222 where components of the hearable device perform VAD techniques to determine that the audio signals represent a voice command 108. For example, the components may use one or more VAD algorithms based on channel energy with long and short term energies, sub-band long and short term energies with combination logic, Deep Neural Network (DNN) based VADs, or any other type of VAD algorithms, with hangover windows, to determine whether the correlation audio signal represents a voice command 108. In some examples, the components may determine that the correlation audio signal does not represent a voice command 108, but instead represents another sound emitted by the user 104, such as a cough. However, if the components determine that the correlation audio signal represents a voice command 108 from the user 104, the components of the hearable device 106 may proceed to perform additional voice-processing techniques included in an audio pipeline. For instance, the components may perform various acoustic-processing techniques, such as beamforming, keyword spotting (e.g., wake word detection), and so forth.

In some examples, the VAD logic stage 222 may utilize the audio data (e.g., 1s and 0s) as a way to determine which portions of the audio signals are correlated, or have similarities, and focus on those portions for VAD purposes. For instance, the components of the hearable device 106 which perform the VAD techniques may analyze the exterior audio signal 208, and determine which portions of the exterior audio signal 208 are correlated to the in-ear audio signal 214 based on the associated 1s in the audio data. The 1s may be associated, such as metadata, with the exterior audio signal 208 to indicate which portions of the external audio signal 208 are correlated with the in-ear signal 214, and thus represent sound from the user 104 on which VAD is to be performed, and the 0s indicate which portions of the exterior audio signal 208 represent ambient noise that is to be ignored for VAD.

The VAD logic stage 222 may further, at 224, perform VAD on the equalized exterior audio signal 208. The VAD logic stage 222 may use similar types of VAD processing, or any types of VAD processing techniques known in the art, to determine whether the exterior audio signal 208 represents a voice command 108 of the user 104. If the components of the hearable device 108 determine that the exterior audio signal 208 represent a voice command 108, the VAD logic stage may use this as an additional indication that the correlated audio signal VAD stage 226 accurately determined that the correlated audio signal represented the voice command 108. In this way, the correlated audio signal may have VAD techniques performed thereon to detect a voice command 108 of the user 104, and the exterior audio signal 208 may additionally have VAD techniques performed thereon at 224 to determine that the exterior audio signal 208 also represents a voice command 108. This additional VAD processing on the exterior audio signal 208 may rule out possibilities that the correlated audio signal represents sounds other than a voice command 108 of the user 104, such as the user 104 coughing or clearing their throat.

After determining at the VAD logic stage 222 that the correlated audio signal represents a voice command 108, and thus the exterior audio signal 208 and the in-ear audio signal 214 each represent the voice command 108, the components of the hearable device 106 may access, at 230, an audio signal buffer that stores at least a portion of the exterior audio signal 208. For instance, the hearable device 106 may store the exterior audio signal 208, or at least a portion of the exterior audio signal 208 (e.g., 15 ms of the audio signal, 100 ms of the audio signal, 500 ms of the audio signal, etc.) in a buffer, such as a ring buffer, for further processing. Upon determining that the correlated audio signal represents the voice command 108, the components of the hearable device 108 may proceed to perform additional voice-processing techniques on the exterior audio signal 208, as described in more detail with respect to FIG. 4.

Figure 3:
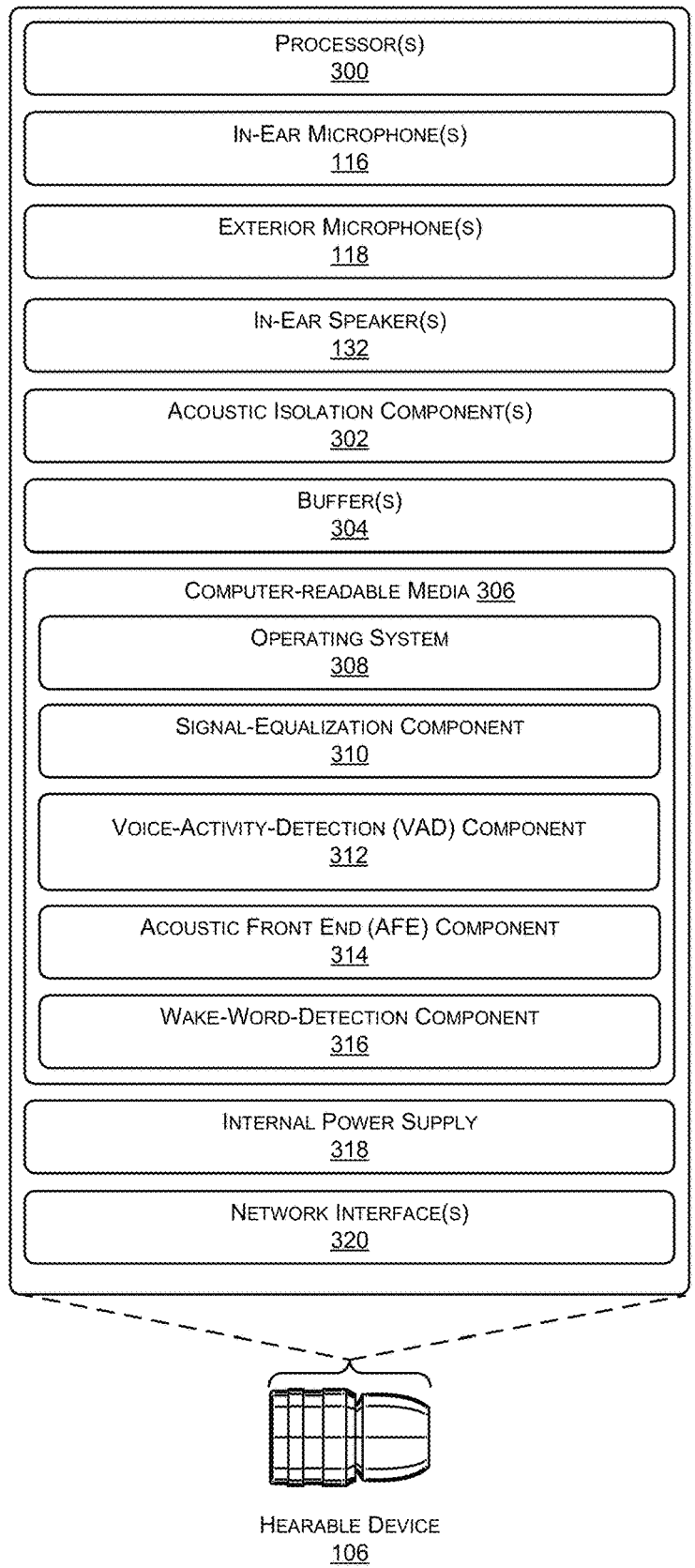
FIG. 3 illustrates a block diagram of an example architecture of a hearable device that includes components for determining that a user of the hearable device issued a voice command, and for performing voice-processing techniques on an audio signal representing the voice command.

FIG. 3 illustrates a block diagram of an example architecture of a hearable device 106 that includes components for determining that a user 104 of the hearable device 106 issued a voice command 108, and for performing voice-processing techniques on an audio signal representing the voice command 108.

The hearable device 108 may include any type of in-ear computing device that may be positioned on or around an ear 114 of the user 104, in the ear 114 of the user 104, or otherwise associated with an ear 114 of the user 104. In the illustrated implementation, the hearable device 106 includes one or more processors 300 configured to power various components of the hearable device 106. Further, the hearable device 106 may include various hardware-based components, such as one or more in-ear microphones 116, one or more exterior microphones 118, one or more in-ear speaker(s) 132, one or more acoustic isolation components 302, and one or more buffers 304.

The in-ear microphone(s) 116 and exterior microphone(s) 118 may function as input devices to receive audio input, such as a voice command 108 from a user 104. The in-ear microphone(s) 116 and exterior microphone(s) 118 may comprise any type of component, such as a transducer, which converts sound into an electrical signal (e.g., audio data). The in-ear microphone(s) 116 may be positioned on or in the hearable device 106 such that the in-ear microphone(s) 116 are able to detect and capture in-era sound 120 emitting from the ear canal 124 of the user's ear 114. The exterior microphone(s) 118 may be positioned on or in the hearable device 106 such that the exterior microphone(s) 118 are able to detect and capture exterior sound 122 emitting from an environment 102 surrounding the user 104. The in-ear speaker(s) 132 may function as an output device to output audio sounds corresponding to audio data, which may be stored in the buffer(s) 304 of the hearable device 106, another memory location, and/or be received from another computing device communicatively coupled to the hearable device 106. In some examples, the in-ear speaker(s) 132 may emit audible statements to communicate with the user 104, and the user 104 may respond or otherwise issue voice commands 108, which may be captured by the microphone(s) 116 and/or 118. Thus, the in-ear speaker(s) 132 may be used in conjunction with the microphone(s) 116 and/or 118 to facilitate a conversation with the user 104. The in-ear speaker(s) 132 may output various types of audio data, such as audio data from a phone call (e.g., a phone call conducted through the user device 140 and communicated to the hearable device 106 using a wireless network), music audio data, or any other type of audio data.

The hearable device 106 may further include the buffer(s) 304 for storing, at least temporarily, various types of data. For instance, if the hearable device 106 is outputting audio data using the in-ear speaker(s) 132, the buffer(s) 304 may store portions of the audio data prior to outputting the audio data. By storing audio data in the buffer(s) 304, the hearable device 106 may perform various types of noise-cancellation techniques. As another example, the buffer(s) 304 may store exterior audio data generated the exterior microphone(s) 118 that represents the exterior sound 122. The exterior audio data may be used for various purposes, such as for performing active acoustic isolation to reduce the amount of exterior sound 122 that reaches the in-ear microphones(s) 116. For instance, the acoustic isolation component(s) 302 may identify a waveform from the exterior audio data store in the buffer(s) 304 that represents ambient noise from the environment 102 of the user 104, or other unwanted noise, generate a waveform configured to cancel out or attenuate the ambient noise, and cause the in-ear speaker(s) 132 (and/or other speakers on the hearable device 106 not illustrated) to output sound corresponding to the waveform to perform active acoustic isolation. In some examples, rather than performing active acoustic isolation, the acoustic isolation component(s) 302 may comprise a material (e.g., foam) that may, at least partially, acoustically isolate the in-ear microphone(s) 116 from the exterior microphone(s) 118.

The hearable device 106 may further include computer-readable media 306 which stores various software components, firmware components, or combinations thereof. The components stored in the computer-readable media 306 may comprise computer-readable instructions (e.g., software, firmware, a combination thereof, etc.) which configured the processor(s) 300 to perform various operations. The computer-readable media 306 may store an operating system 308 configured to manage hardware, software, firmware, and/or other systems and services within and coupled to the hearable device 106. The computer-readable media 306 may additionally store one or more applications, such as music playing applications, telephone call conducting applications, or any other type of applications appropriate for a hearable device 106. The applications may be configured to play songs or other audio data/files by causing the processor(s) 300 to output audio data using the in-ear speaker(s) 132.

The computer-readable media 306 may include a signal-equalization component 310 that, when executed by the processor(s) 300, may perform various types of equalization techniques on the audio signals generated by the in-ear microphone(s) 116 and/or the exterior microphone(s) 118. To perform the equalization techniques (e.g., exterior audio signal-equalization process 210, in-ear audio signal-equalization process 216, etc.), the signal-equalization component 310 may include or utilize components such as one or more filters (e.g., low-pass filter, high-pass filter, band-pass filter, etc.) to attenuate frequencies, one or more frequency amplifiers (e.g., operation amplifiers) to boost/amplify frequencies, and/or any other type of equalization processing techniques. In some examples, the signal-equalization component 310 may equalize one or both of the exterior audio signal 208 and in-ear audio signal 214. For example, the exterior sound 122 captured by the exterior microphone(s) 118 may include ambient noise from the environment 104 of the user 104, a frequency response caused by the auricle 130 of the user's ear 114 (e.g., a head-related transfer function (HRTF) response), high amplitude peaks, and other types of undesirable attributes. In such examples, the signal-equalization component 310 may include or utilize various components to, for example, attenuate a portion of the exterior audio signal 208, filter out a portion of the exterior audio signal 208, and other types of equalization techniques. Additionally, the signal-equalization component 310 may perform equalization techniques on the in-ear audio signal 214. The -ear audio signal 214 may represent the in-ear sound 120 that is transmitted through the inner-ear 114 of the user 104 and out the ear canal 124, and may be affected by bone of the inner-ear, tissue of the inner-ear, etc., though which the sound passes. For instance, sound 120 from the user 104 that emits from the user's ear canal 124 may have a lower resonance based on the length of the user's ear canal 124, a fall-off at higher frequencies, and/or lack amplitude peaks when compared to sound that comes from the user's 104 mouth. In light of this, the signal-equalization component 310 may perform equalization techniques on the in-ear audio signal 214, such as attenuating/modifying a portion of the in-ear audio signal 214, filtering out a portion of the in-ear audio signal 214, etc. Accordingly, the signal-equalization component 310 may perform equalization techniques on one or both of the in-ear audio signal 214 and the exterior audio signal 208 such that the two audio signals are in a same, or similar, bandwidth, which may help identify correlations between the two signals.

The computer-readable media 306 may further include a voice activity detection (VAD) component 314 to perform VAD techniques. The VAD component 312 may perform the techniques discussed with reference to the VAD logic stage 222 of FIG. 2. For instance, the VAD component 312 may utilize one or more VAD algorithms based on channel energy with long and short term energies, sub-band long and short term energies with combination logic, Deep Neural Network (DNN) based VADs, or any other type of VAD algorithms, with hangover windows, to determine whether the correlation audio signal represents a voice command 108.

The computer-readable media 306 may further include an acoustic front end (AFE) component 314 to perform various acoustic-processing techniques on the audio signals, such as beamforming, noise-cancellation, echo cancellation, and so forth. Details regarding some examples of the audio signal processing performed by the AFE component 314 are described in detail with reference to FIG. 4. Further, the computer-readable media 306 may include a wake-word-detection component 316 to detect, in one or more of the exterior audio signal 208, the in-ear audio signal 214, and/or the correlated audio signal, a wake word or keyword. Details regarding some examples of the wake-word-detection techniques performed by the wake-word-detection component 316 are described in detail with reference to FIG. 4.

The hearable device may be powered, at least partially, be an internal power supply 318. For instance, the hearable device 106 may include one or more of batteries, battery banks, supercapacitors, rechargeable batteries, or any other type of internal power supply which may be charged using mains-power, and provide power to the hearable device 106.

The hearable device 106 may further include one or more network interfaces 320 that may be utilized by the hearable device 106 to communicate with other devices over networks, such as the network(s) 134. Generally, the network interface(s) 320 enable the hearable device 106 to communicate over any type of network, such as a wired network (e.g., USB, Auxiliary, cable etc.), as well as wireless networks (e.g., WiFi, Bluetooth, Personal Area Networks, Wide Area Networks, and so forth). In some examples, the network interface(s) 320 may include a wireless unit coupled to an antenna to facilitate wireless connection to a network. However, the network interface(s) may include any type of component (e.g., hardware, software, firmware, etc.) usable by the hearable device 106 to communicate over any type of wired or wireless network. The network interface(s) 320 may enable the hearable device 106 to communicate over networks such as a wireless or Wi-Fi network communications interface, an Ethernet communications interface, a cellular network communications interface, a Bluetooth communications interface, etc., for communications over various types of networks 134, including wide-area network, local-area networks, private networks, public networks etc. In the case of a wireless communications interfaces, such network interface(s) 320 may include radio transceivers and associated control circuits and logic for implementing appropriate communication protocols.

FIGS. 2 and 4-6 illustrate flow diagrams of example methods for performing various techniques disclosed herein. The example methods 200, 400, 500, and 600 are illustrated as logical flow graphs, each operation of which represents a sequence of operations that can be implemented in hardware, software, or a combination thereof. In the context of software, the operations may represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described ion example methods 200, 400, 500, and 600 is not intended to be construed as a limitation, and any number of the described operations can be combined in any order and/or in parallel to implement the process.

Figure 4:
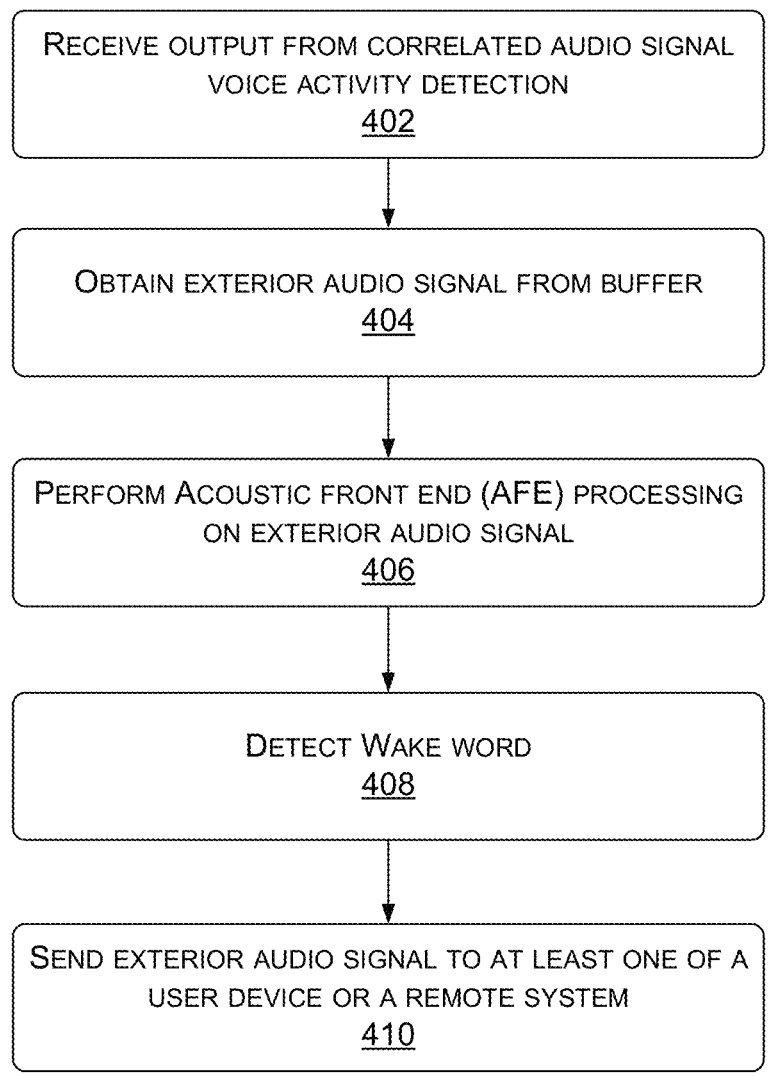
FIG. 4 illustrates a flow diagram of an example method performed by a hearable device for performing voice-processing techniques on an audio signal which represents a voice command of a user of the hearable device.

FIG. 4 illustrates a flow diagram of an example method 400 performed by a hearable device 106 for performing voice-processing techniques on an audio signal which represents a voice command 108 of a user 104 of the hearable device 106.

At 402, the AFE component 314 may receive output from the correlated audio signal VAD process 226. In some examples, the output may indicate whether or not the exterior audio signal 208 and the in-ear audio signal 214 represent a voice command 108 of the user 104 as determined using VAD techniques. For instance, the VAD component 312 may output a "1," or other indication, that the exterior audio signal 208 and the in-ear audio signal 214 represent the voice command 108 of the user 104, and output a "0," or other indication," that the exterior audio signal 208 and the in-ear audio signal 214 do not represent a voice command 108 of the user 104.

At 404, upon receiving an indication that the exterior audio signal 208 and the in-ear audio signal 214 represent a voice command 108 of the user 104 of the hearable device 106, the AFE component 314 may obtain the exterior audio signal 208 from the buffer(s) 304 of the hearable device 106. For example, the exterior audio signal 208 may be stored in a ring buffer of the hearable device 106 upon being generated by the exterior microphone(s) 118.

At 406, the AFE component 314 may perform AFE processing on the exterior audio signal 208. For example, the AFE component 314 may perform different types of acoustic signal processing on the exterior audio signal 208, such as acoustic echo cancellation or suppression for reducing acoustic echo generated by, for example, acoustic coupling between the microphone(s) 116 and/or 118 and in-ear speaker(s) 132 of the hearable device 106, or speakers of other devices in an environment of the hearable device 106. The AFE component 314 may further perform noise reduction techniques for reducing ambient noise in the exterior audio signal 208, such as sound emitted in the environment of the user 104 other than the voice command 108 (e.g., noise from secondary devices 110, secondary user 112, etc.). The AFE component 314 further include one or more audio beamformers or beamforming components configured to generate directional audio signals that are focused in different directions. More specifically, the beamforming components of the AFE component 314 may produce directional audio signals that emphasize sounds originating from different areas of the environment of the hearable device 106 or from different directions relative to the hearable device 106. For instance, the AFE component 314 may performing beamforming on the exterior audio signal 208 to have signals emitting from a direction of the user 104 experience constructive interference, and signals emitting from the environment 102 experience destructive interference.

At 408, the wake-word-detection component 316 may detect a wake word in the exterior audio signal 208 using one or more wake word detection techniques. For instance, the wake-word-detection component 316 may detect a predefined trigger expression or word (e.g., "awake"), which may be followed by instructions or directives (e.g., "please end my phone call," "please stop the music," etc.). The wake word maybe a reserved keyword that is detected by the hearable device 106, such as by using an expression detector of the wake word component 316 that analyzes the exterior audio signal 208 using ASR techniques to detect the wake word, which generally may be a predefined word, phrase, or other sound. Such an expression detector may be implemented using keyword-spotting technology, as an example. A keyword spotter may comprise a functional component or algorithm that evaluates an audio signal to detect the presence a predefined word or expression in the audio signal. Rather than producing a transcription of the words of the speech, a keyword spotter may generate a true/false output to indicate whether or not the predefined word or expression was represented in the audio signal. In certain embodiments, the expression detector of the wake-word-detection component 316 may be configured to analyze the exterior audio signal 208 to produce a score indicating a likelihood that the wake word is represented in the exterior audio signal 208. The expression detector then compares the score to a threshold to determine whether the wake word will be declared as having been spoken. For instance, the ASR techniques may involve using a Hidden Markov Model (HMM) recognizer that performs acoustic modeling of the audio signal and compares the HMM model of the audio signal to one or more reference HMM models that have been created by training for a specific trigger expression. The wake word detection may also use a support vector machine (SVM) classifier that receives the one or more feature scores produced by the HMM recognizer. The SVM classifier produces a confidence score indicating the likelihood that an audio signal contains the wake word.

At 410, the hearable device 106 may send, based at least in part on detecting the wake word in the exterior audio signal 208, the exterior audio signal 208 to at least one of the network-accessible resource(s) 138, or the user device 104, which in turn sends the exterior audio signal 208 to the network-accessible resource(s) 138. For example, by detecting the wake word in the exterior audio signal 208, the hearable device 106 may determine that the voice command 108 is intended to be received and acted upon by the hearable device 106 and/or remote system(s) 136. The hearable device 106 may begin streaming the exterior audio signal 208 to the user device 140 or the remote system(s) 136 responsive to detecting the wake word. In some instances, the hearable device 106 may operate in a low-functionality mode and analyze the exterior audio signal 208 at the equalization stage 212, the audio-signal-correlation state 218, and the VAD logic stage 222. When the wake word is detected using wake-word-detection component 316, the hearable device 106 may begin streaming the exterior audio signal 208, and potentially other data, to at least one of the use device 140 and/or the remote system(s) 136.

Figure 5:
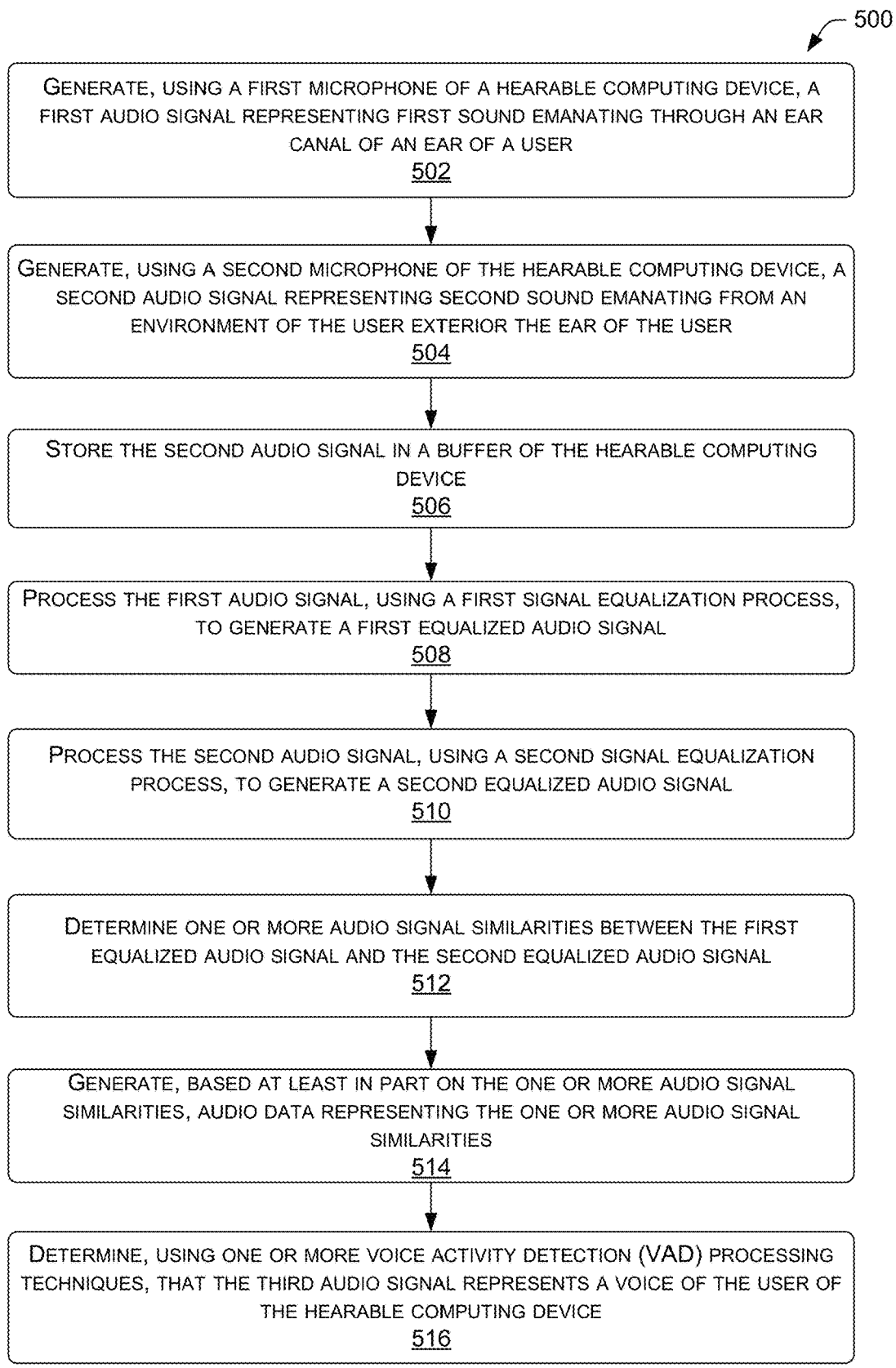
FIG. 5 illustrates a flow diagram of an example method performed by a hearable device for using an in-ear microphone and an exterior microphone to determine that a user of the hearable device issued a voice command.

FIG. 5 illustrates a flow diagram of an example method 500 performed by at least partly by a hearable device 106 for using an in-ear microphone 116 and an exterior microphone 118 to determine that a user 104 of the hearable device 106 issued a voice command 108. As noted above, the hearable device 106 may be a wireless earbud configured to be partially disposed in an ear of the user.

At 502, the hearable device 106 may generate, using the first microphone (e.g., in-ear microphone 116), a first audio signal (e.g., in-ear audio signal 214) representing the first sound (e.g., in-ear sound 120). At 504, the hearable device 106 may further generate, using the second microphone (e.g., exterior microphone 118), a second audio signal (e.g., exterior audio signal 208) representing the second sound (e.g., exterior sound 122). At 506, the hearable device may store the second audio signal in a buffer (e.g., buffer(s) 304) of the hearable computing device 106.

At 508, the hearable device 106 may process the first audio signal using a first signal-equalization process to generate a first equalized audio signal. For example, the signal-equalization component 310 may perform equalization techniques, such as in-ear audio signal-equalization process 216 of the equalization stage 212. In some examples, the signal-equalization component 310 may process the first audio signal to generate the first equalized audio signal by performing at least one of removing a first portion of the first audio signal corresponding to a first frequency that is lower than a first threshold frequency, or amplifying a second portion of the first audio signal from a first frequency range to a second frequency range. In this way, the signal-equalization component 310 may generate the first equalized audio signal. In some examples, the hearable device 106 may process the first audio signal by attenuating a first frequency component of the first audio signal to generate a first equalized audio signal. For instance, the in-ear audio signal equalization stage 216 may include one or more components, such as a parametric equalizer and/or filters, configured to attenuate/boost amplitudes certain frequency components (e.g., lower frequency components) included in the in-ear audio signal 214 (e.g., attenuate a low frequency component of approximately 500 Hz by various up to 20 dB).

At 510, the hearable device 106 may process the second audio signal, using a second signal-equalization process, to generate a second equalized audio signal. For example, the signal-equalization component 310 may perform equalization techniques, such as exterior audio signal-equalization process 210 of the equalization stage 212. In some examples, the signal-equalization component 310 may process the second audio signal to generate the second equalized audio signal by performing at least one of removing a first portion of the second audio signal corresponding to a second frequency that is higher than a second threshold frequency, or attenuating a second portion of the second audio signal from a third frequency range to the second frequency range. In this way, the signal-equalization component 310 may generate the second equalized audio signal. In some examples, processing the second audio signal may comprise attenuating a second frequency component of the second audio signal to generate a second equalized audio signal. For instance, the exterior audio signal equalization stage 210 may include a low-pass filter, and/or band-pass filter, configured to attenuate high frequency components of the exterior audio signal 208 to lower than a threshold frequency (e.g., 3 kHz).

At 512, the hearable device 106 may determine one or more audio signal similarities between the first equalized audio signal and the second equalized audio signal. For example, the signal-equalization component 310 of the hearable device 106 may derive correlations, commonalities, or similarities between the first equalized audio signal and the second equalized audio signal, such as correlations between waveforms, correlations between signal amplitude peaks and/or lows, correlations between waveform timing, and so forth.

In some examples, the hearable device 106 may determine the one or more audio signal similarities by identifying a first energy measure associated with a first frequency range of the first equalized audio signal, identifying a second energy measure associated with a second frequency range of the second equalized audio signal, and identifying a correlation between the first energy measure and the second energy measure. For example, the hearable device 106 may utilize various techniques, such as various forms of Fourier transforms (e.g., Fast Fourier Transforms (FFTs), discrete Fourier Transforms, inverse FFTs, etc.), Laplace Transforms, Z Transforms, or any other type of transform to identify frequency components of the equalized audio signals. The hearable device 106 may further be configured to identify energy measurements for one or more of the frequency components/bands of the two equalized signals. If the energy represented in the frequency bands are similar, or the same, then it may be determined that the audio data represents the same sound. Further, if the energies determined for the two equalized signals have more than a threshold correlation, or similarity, over a period of time (e.g., multiple frequency bands or components over time), then the hearable device 106 may determine that the user 104 is speaking and each of the microphones detected, and captured, the user speaking. For example, the hearable device 106 may separate the first equalized audio signal into a first sequence of first time frames representing first samples of the first equalized audio signal; separate each of the first time frames into multiple first frequency bands in the first frequency range; separate the second equalized audio signal into a second sequence of second time frames representing second samples of the second equalized audio signal; and separate each of the second time frames into multiple second frequency bands in the second frequency range. Further, the hearable device 106 may identify, for each of the multiple first frequency bands in the first frequency range, first energy measures; identify, for each of the multiple second frequency bands in the second frequency range, second energy measures; identify correlations between the first energy measures and the second energy measures; and determine that the correlations between the first energy measures and the second energy measures are higher than threshold correlation value. In such examples, determining, by the hearable device, that the second audio signal represents the utterance by the user is further based at least in part on the correlations being higher than the threshold correlation value.

At 514, the hearable device 106 may generate, based at least in part on the one or more audio signal similarities, audio data representing the one or more audio signal similarities. For example, the signal-equalization component 310 may determine, select, or otherwise generate a correlated audio signal which represents at least a portion of the correlations between the in-ear audio signal and the exterior audio signal. In some instances, the signal-equalization component 310 may identify portions of the first equalized signal that are similar to (e.g., same or similar energies in frequency bands) portions of the second equalized signal. The signal-equalization component 310 may associate a logic-high indication (e.g., a "1") with a portion of the second equalized signal that is similar to the first equalized audio signal, and associate a logic-low indication (e.g., a "0") with a portion of the second equalized signal that is not similar to, or correlated with, the first equalized audio signal. Using the logic-high and logic-low indications, the hearable device 106 may be able to identify which portions of the second equalized audio signal correspond to the first equalized audio signal, and perform voice-activity detection on the portions of the second (or first) equalized audio signal that are correlated with the other equalized audio signal.

At 516, the hearable device 106 may determine, using one or more voice-activity-detection (VAD) processing techniques, that the third audio signal represents speech of the user 104 of the hearable device 106. For example, the VAD component 312 may performing VAD processing techniques to detect speech of the user 104.

In some examples, the method 500 may include further operations. For example, the hearable device may store the second audio signal in a ring buffer 304 of the hearable device 106, and subsequently obtain the second audio signal from the buffer 304. The AFE component 314 may then process, using one or more acoustic-processing techniques, the second audio signal to generate a fourth audio signal. The wake-word-detection component 316 may process the fourth audio signal using one or more keyword-spotting techniques to determine that the speech of the user represented by the fourth audio signal represents a keyword. Further, the hearable device 106 may transmit, over a network 134, the fourth audio signal to a user device 140 associated with the hearable device 106 (e.g., via Bluetooth, WiFi, etc.).

In various examples, the method 500 may further include additional VAD processing operations. For example, the VAD component 312 may determine, using the one or more VAD processing techniques, that the second equalized audio signal represents the speech, and further determine that the third audio signal represents the speech of the user 104 based at least in part on determining, using the one or more VAD processing techniques, that the second equalized audio signal representing the speech.

FIG. 6 illustrates a flow diagram of another example method 600 performed by a hearable device 106 for using an in-ear microphone 116 and an exterior microphone 118 to determine that a user 104 of the hearable device 106 issued a voice command 108.

At 602, the hearable device 106 may generate, at least partly using a first microphone of an in-ear computing device, first audio data representing first sound emanating through an ear canal of a user of the in-ear computing device.

At 604, the hearable device 106 may generate, at least partly using a second microphone of the in-ear computing device, second audio data representing second sound emanating from an environment of the user. At 606, the hearable device 106 may determine one or more correlations between the first audio data and the second audio data.

In some examples, at 606 the hearable device 106 may attenuate a first frequency component of the first audio data to generate first equalized audio data; attenuate a second frequency component of the second audio data to generate second equalized audio data; and identify, from the first equalized audio data and the second equalized audio data, the one or more correlations. In such examples, determining the one or more correlations may comprise identifying a first energy measure associated with a first frequency range of the first audio data; identifying a second energy measure associated with a second frequency range of the second audio data, wherein the second frequency range at least partially overlaps with the first frequency range; and identifying the one or more correlations between the first energy measure and the second energy measure.

At 608, the hearable device 106 may determine, based at least in part on the one or more correlations, that the first audio data and the second audio data each represent speech of the user of the in-ear computing device.

In some examples, determining that the first audio data and the second audio data each represent the speech of the user of the in-ear computing device may comprise identifying a portion of the second audio data corresponding to the second frequency range, and determining, using one or more voice activity detection (VAD) techniques, that the portion of the second audio data represents at least a portion of the utterance of the user of the ear-based device.

In various examples, the method 600 may further include processing the first audio data, using a first signal-equalization process, to generate first equalized audio data, processing the second audio data, using a second signal-equalization process, to generate second equalized audio data and analyzing the first equalized audio data and the second equalized audio data to identify the one or more correlations. However, this step may be optional depending on whether it is determined that the audio signals are to be equalized for ease in comparison.

Figure 7:
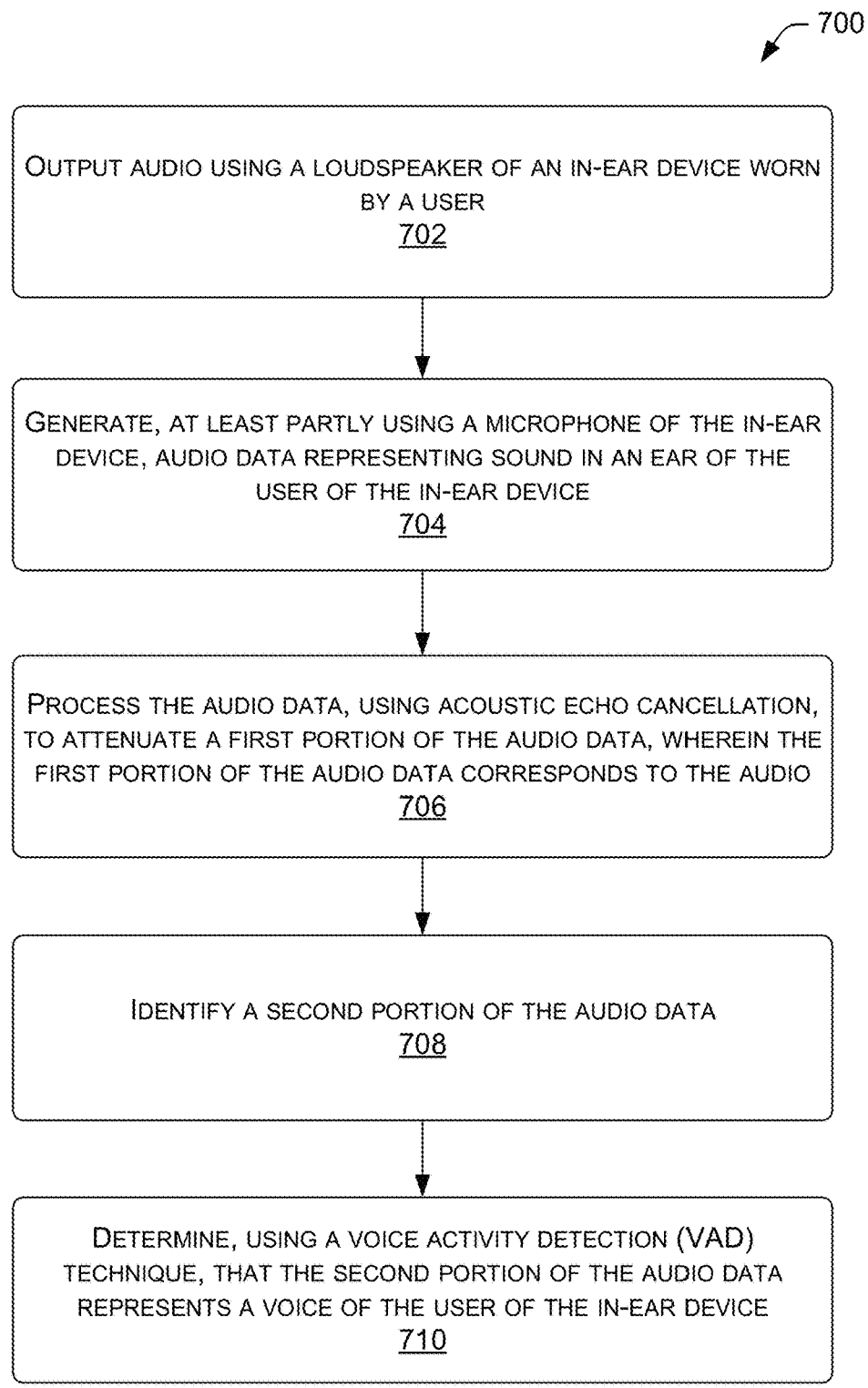
FIG. 7 illustrates a flow diagram of an example method performed by a hearable device for using only an in-ear microphone to determine that a user of the hearable device issued a voice command.

FIG. 7 illustrates a flow diagram of an example method 700 performed by a hearable device for using only an in-ear microphone to determine that a user of the hearable device issued a voice command.

Many of the techniques described herein target determining that the user 104 of the hearable device 106 is issuing a voice command 108 using the in-ear microphone 116 to generate an in-ear audio signal 214, and also using exterior microphone 118 to generate an exterior audio signal 208, and identifying correlations between the two audio signals for use in voice-activity detection. However, the techniques described herein may also include the hearable device 106 determining that the user 104 of the hearable device 106 is speaking a voice command 108 using a single microphone of the hearable device 106, such as the in-ear microphone 116. An example method 700 is described below that illustrates using the in-ear microphone 116 of the hearable device 106 (e.g., in-ear device) to determine that the user 104 is speaking.

At 702, the in-ear device 106 may output audio using a loudspeaker (e.g., transducer) of the in-ear device 106, such as in-ear speaker 132. In some examples, the in-ear device 1206 may store the audio signal that is used to output the audio may be stored, at least for a period of time before being output using the in-ear speaker 132, in a buffer 304 of the in-ear device 106.

At 704, the in-ear device 106 may generate, at least partly using a microphone (e.g., in-ear microphone 116) of the in-ear device 106, audio data representing sound 120 in an ear 114 of the user 104 of the in-ear device 106. In some examples, the sound (e.g., in-ear sound 120) may have been emitted from various sources, such as the in-ear speaker 132, a voice of the user 104, or other sources. In various examples, the in-ear sound 120 may correspond primarily, or entirely, to sound in the ear 114 of the user 104. For instance, acoustic isolation of the in-ear device 106 may prevent exterior sound 122 from being captured by the in-ear microphone 116.

At 706, the in-ear device 106 may process the audio data, using acoustic echo cancellation (AEC), to attenuate a first portion of the audio data. In some examples, the first portion of the audio data may correspond to the audio that is being output by the in-ear speaker 132 of the in-ear device 106. For example, one or more components of the in-ear device 106 may process the audio data (e.g., signal-equalization component 310, AFE component 314, etc.) using AEC techniques to attenuate the first portion of the audio data. The audio signal that is being output by the in-ear speaker 132 may be stored in the buffer 304 before being output, and the component(s) of the in-ear device 106 may utilize the audio signal to attenuate the sound represented in the audio data that corresponds to the audio signal. Stated otherwise, the component(s) of the in-ear device 106 may attenuate the sound represented in the audio data captured by the in-ear microphone 116 that is attributable to the audio being output by the in-ear speaker 132. For instance, the components of the in-ear device 106 may attenuate the first portion of the audio data that represents the audio being output by the in-ear speaker 132 by various amounts, such as 30-40 decibels (dB). The AEC techniques performed may include one or more different types of acoustic echo cancellation to attenuate, or otherwise remove, the first portion of the audio data, where the first portion of audio data corresponds to the audio output by the in-ear speaker 132.

At 708, the component(s) of the in-ear device 106 may identify a second portion of the audio data. For instance, the component(s) of the in-ear device 106 may identify a waveform represented in the audio data after the first portion of the audio data has been attenuated or removed. In some examples, the second portion of the audio data may correspond to sound captured by the in-ear microphone 116 other than the audio being output by the in-ear microphone 116.

At 710, the component(s) of the in-ear device 106 may determine, using one or more voice activity detection (VAD) techniques, that the second portion of the audio data represents a voice of the user 104 of the in-ear device 106. For instance, the component(s) of the in-ear device 106 may utilize various types of VAD, such as variable frame rate analysis for VAD. The component(s) of the in-ear device 106 may analyze samples, or frames, of the audio data and determine whether the frames, which primarily represent the second portion of the audio data, are dominated by voice, or by noise-background noise. If the component(s) of the in-ear device 106 determine that a frame representing the audio data represents voice, then the VAD component 312 may associate an indicator, such as a "1," with that frame. Alternatively, if a frame representing the audio data does not represent voice, then the VAD component 312 may associate a different indicator, such as a "0," with that frame. In this way, the different portions, or frames, that represent the second portion of the audio data may be associated with metadata indicating whether or not the frames represent voice. However, any type of VAD technique may be used to determine whether the audio data represents voice of the user 106. In this way, a single microphone (e.g., in-ear microphone 132) may be used by the in-ear device 106 to determine whether a user 104 is speaking. In some examples, the audio may not be played, and AEC techniques may not be performed. In other examples, depending on the type or configuration of the in-ear device 106, the AEC may additionally, or alternatively, be used to cancel other sound, such as exterior sound 122 (e.g., when acoustic isolation is insufficient to sufficiently remove the exterior sound 122 or other ambient noise).

In some implementations, the processors(s) 140 and 300 may include a central processing unit (CPU), a graphics processing unit (GPU), both CPU and GPU, a microprocessor, a digital signal processor and/or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processors(s) 140 and 300 may possess its own local memory, which also may store program modules, program data, and/or one or more operating systems. The processors(s) 140 and 300 may be located in a single device or system, or across disparate devices or systems, which may be owned or operated by various entities.

The computer-readable media 142 and 306 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 142 and 306 may be implemented as computer-readable storage media ("CRSM"), which may be any available physical media accessible by the processor(s) 128 and/or 300 to execute instructions stored on the memory 142 and 306. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processors(s) 140 and 300.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. An ear-based device comprising:
   one or more processors;
   a first microphone positioned to capture first sound from an ear of a user of the ear-based device;
   a second microphone positioned to capture second sound from an environment of the user; and
   computer-readable media storing computer-executable instructions that, when executed by the one or more processors, cause the one or more processors to perform operations comprising:
   generating, using the first microphone, first audio data representing the first sound;
   generating, using the second microphone, second audio data representing the second sound;
   determining one or more similarities between the first audio data and the second audio data;
   generating a correlated audio signal based at least in part on at least a portion of the first audio data and at least a portion of the second audio data;
   processing the correlated audio signal using a voice activity detection (VAD) technique; and
   determining, based at least in part on using the VAD technique to process the correlated audio signal, that the first audio data and the second audio data each represent an utterance of the user.

2. The ear-based device of claim 1, the operations further comprising:
   attenuating a first frequency range of the first audio data to generate first equalized audio data;
   attenuating a second frequency range of the second audio data to generate second equalized audio data; and
   analyzing the first equalized audio data and the second equalized audio data to identify the one or more similarities.

3. The ear-based device of claim 2, wherein determining that the first audio data and the second audio data each represent the utterance of the user comprises:
   identifying a portion of the second equalized audio data having the one or more similarities with the first equalized audio data; and
   determining, using the VAD technique, that the portion of the second equalized audio data represents at least a portion of the utterance.

4. The ear-based device of claim 3, wherein determining that the first audio data and the second audio data each represent the utterance of the user further comprises:
   determining, using the VAD technique, that the second audio data represents the utterance.

5. The ear-based device of claim 1, wherein determining the one or more similarities comprises:
   identifying a first energy measure associated with a first frequency range of the first audio data;
   identifying a second energy measure associated with a second frequency range of the second audio data, wherein the second frequency range at least partially overlaps with the first frequency range; and
   identifying the one or more similarities between the first energy measure and the second energy measure.

6. The ear-based device of claim 5, wherein determining that the first audio data and the second audio data each represent the utterance comprises:
   identifying a portion of the second audio data corresponding to the second frequency range; and
   determining, using the VAD technique, that the portion of the second audio data corresponding to the second frequency range represents at least a portion of the utterance.

7. The ear-based device of claim 1, further comprising:
   a loudspeaker; and
   an active isolation component that at least partially acoustically isolates the first microphone from the second microphone by:
   identifying a portion of the second audio data representing ambient noise from the environment of the user; and
   causing the loudspeaker to emit third sound to at least partially prevent the ambient noise from being captured by the first microphone.

8. The ear-based device of claim 1, the operations further comprising generating metadata associated with the one or more similarities between the first audio data and the second audio data, and
   wherein determining that the first audio data and the second audio data each represent the utterance is further based at least in part on the metadata.

* * * * *